Dec. 13, 1955   L. E. RUSSELL   2,726,673
VALVE
Filed June 22, 1951
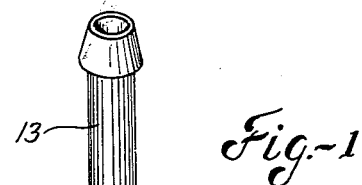
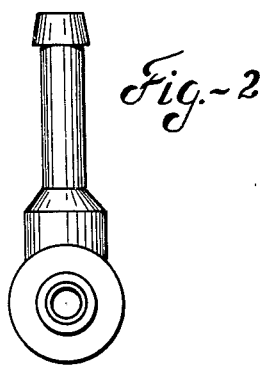
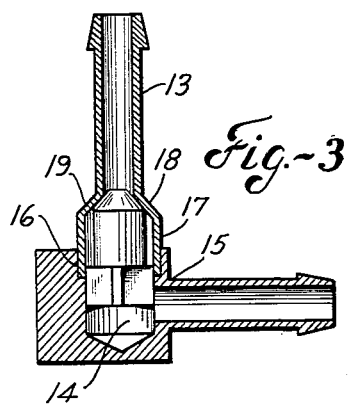
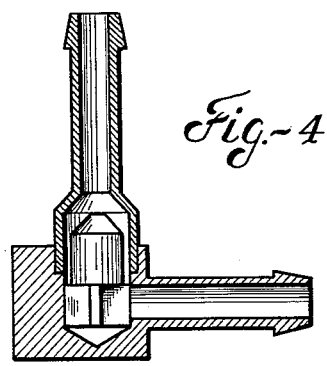
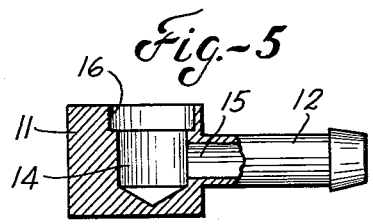
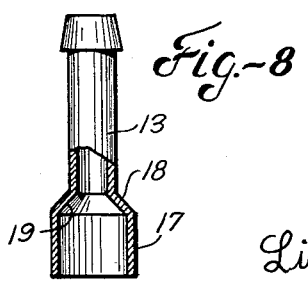
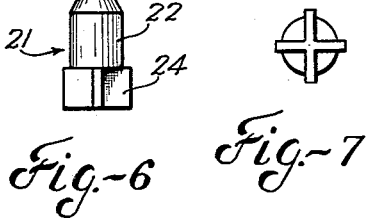
Inventor
Linus E. Russell
Tom Walker
Attorney

United States Patent Office 2,726,673
Patented Dec. 13, 1955

2,726,673

VALVE

Linus E. Russell, Springfield, Ohio, assignor to Peters & Russell, Inc., Springfield, Ohio, a corporation of Ohio Application June 22, 1951, Serial No. 232,910

3 Claims. (Cl. 137—332)

This invention relates to check valves, and particularly to unitary devices of this class to be interposed in hose lines or installed in tire pumps and like devices.

The object of the invention is to simplify the construction as well as the means and mode of operation of valve assemblies whereby such assemblies may not only be economically manufactured, but will be more efficient and satisfactory in use, adaptable to a wide variety of applications, having relatively few parts and be unlikely to get out of repair.

An object of the invention is to provide a valve of the class described especially characterized by a simplicity of construction and operation and by a long useful life.

Another object of the invention is to utilize in a check valve unit a freely movable valve element characterized in that it is made of a relatively soft deformable material.

A further object of the invention is to achieve continuous repositioning of the valve element in a rotary sense whereby to avoid localized wear resulting from engagement of the valve element with the valve seat.

Still another object of the invention is to accomplish rotary adjustment of the valve element as described in response to the flow of pressure fluid past the valve.

A further object of the invention is to provide a valve assembly possessing the advantageous structural features, the inherent meritorious characteristics and the mode of operation herein mentioned.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

Referring to the accompanying drawing, wherein is found the preferred but obviously not necessarily the only form of embodiment of the invention, Fig. 1 is a perspective view of a valve unit in accordance with the instant invention;

Fig. 2 is a front end view of the unit;

Fig. 3 is a view in longitudinal section through the unit, showing the valve element in seated or closed position;

Fig. 4 is a view similar to Fig. 3, showing the valve element in unseated or open position;

Fig. 5 is a detail view in longitudinal section of the body portion of the unit with integral connector fitting;

Fig. 6 is a detail view in side elevation of the valve element;

Fig. 7 is a view in end elevation of the valve element; and

Fig. 8 is a view in side elevation, partly broken away, of a tubular connector fitting detachably received in the body.

Like parts are indicated by similar characters of reference throughout the several views.

Referring to the drawings, a check valve in accordance with the illustrative embodiment of the invention comprises a body 11 of cylindrical shape. At one end of the body is an integral tubular projection 12 terminating at its outer end in a hose nipple formation. Projecting radially from the body 11 is a similar tubular projection 13 terminating in a similiar nipple formation. It will be understood that the unit so defined is constructed and arranged to be interposed in a pressure fluid hose line or to be installed in a tire pump or the like, one projection 12 or 13 being inserted in a deformable base on the pump and the other projection being connected to a discharge hose line.

Considering the interior of the valve unit, the body 11 is formed with a radial bore 14 and an axial opening 15, the former registering and communicating with the tubular projection 13 and the latter being a continuation of the projection 12 and communicating it with the bore 14 at a point intermediate its ends. The outer end of the bore 14 is formed with a counterbore 16 receiving an expanded skirt 17 on the projection 13. The skirt 17 and shank proper of the projection 13 are connected by a taper formation 18 defining on its internal surface a valve seat 19.

The area enclosed by skirt 17, and the bore 14, comprises a valve chamber within which is a freely movable valve member 21. The member 21 is made of a soft rubber or rubber-like material and includes a cylindrical body portion 22 of smaller diameter than the bore 14. On one end of the body portion 22 is formed a tapered nose portion 23 and on the other end thereof is a finned portion 24. The nose portion 23 has a complementary relation to the valve seat 19 so as to engage the seat and close off communication of the tubular projection 13 with the bore 14 and therefore with the tubular projection 12. The finned portion 24 is wider than the body portion 22 so that it may slidingly engage the wall of bore 14 and thereby guide the valve member in its axial reciprocating motion toward and from the seat 19. It will be noted that because of the spacing of the body portion 22 from the side of the bore 14 and by reason of the blade-like arrangement of finned portion 24, flow around the valve member 21 is relatively unrestricted. Also, it will be noted that the finned portion 24 of the valve intersects the axis of the tubular projection 12. Accordingly, pressure fluid flowing or applied in the bore 14 impinges on the blades making up finned portion 24 in a manner to impart a rotary impulse to the valve member. Axial motion of the valve member, under influence of fluid pressure, this is accompanied by rotary adjustments of the member.

As here constructed and arranged, the tubular projection 13 represents the pressure fluid inlet and projection 12 the pressure fluid outlet. In the absence of pressure in the line, the valve member 21 will assume a position which is a function of gravity influence, for example the position shown in Fig. 4. In the presence of back pressure in the line communicating with the projection 12, such pressure acts on the bottom of member 21 urging it to the seated or closed position of Fig. 3. With the part positioned as shown in Fig. 3, an overbalancing pressure applied through the projection 13 unseats the valve member 21 and allows pressure fluid to pass around the member to outlet projection 12. When the supply of such overbalancing pressure is discontinued, the back pressure applied through projection 12 returns the valve member to seated position. In the course of such axial reciprocating motion from and to seated position the valve member is automatically turned as before described so that the reengagement with seat 19 is effected in a relatively different position in a rotary sense.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described my invention, I claim:

1. A check valve for interposing in a line of pulsating fluid pressure, including a body, a pair of tubular fittings projecting from said body in angular relation to one another, said fittings being formed for connection in a flexible fluid conducting hose line, a bore in said body having a closed bottom and an open top, in coaxial communicating relation with one of said fittings, said one fitting having an expanded portion cooperatively engaged with said body and a reduced diameter portion elongated with respect to said expanded portion and connected thereto by a taper portion defining a valve seat, said bore and the expanded portion of said one fitting defining a valve chamber, a cylindrical valve element reciprocable in said expanded portion of said one fitting and having one end engageable with said valve seat, and a finned structure on the opposite end of said valve element having a sliding mount in said bore and supporting said valve element in elevated relation to the bottom of said bore, said other fitting communicating with said bore in a lateral sense near the bottom of said bore beneath said valve element.

2. A check valve according to claim 1, characterized in that said valve element and finned structure comprise a unitary part made of a relatively soft and deformable material.

3. A check valve for interposing in a line of pulsating fluid pressure, including a cylindrical body having a longitudinal bore, a tubular fitting extending axially from said body as a part thereof and as an extension of said bore, the outer end of said fitting being enlarged for frictional installation of said body in resilient deformable means, a radial bore in said body opening through the surface of said body and intersecting said longitudinal bore, a counterbore in said radial bore, another tubular fitting having an outer end enlarged for frictional reception in resilient deformable means and an inner end expanded for reception in said counterbore, the interior of said expanded end registering with and defining a continuation of said radial bore, said other fitting being formed at the base of said expanded end with a taper portion defining a valve seat, a cylindrical valve element reciprocable in said radial bore and the interior of said expanded end of said other fitting, said valve element having on one end thereof a nose portion engageable with said valve seat, and spaced apart radial vanes in underlying attached relation to said valve element at the other end thereof in sliding contact with the wall of said radial bore and the interior wall of the expanded end of said other fitting, said vanes being engageable with the bottom of said radial bore to hold said valve element above the longitudinal axis of said first fittting.

References Cited in the file of this patent
UNITED STATES PATENTS

| | | |
|---|---|---|
| 32,430 | Minthorn | May 28, 1861 |
| 725,640 | Wemmer | Apr. 14, 1903 |
| 763,876 | Geiger | June 28, 1904 |
| 770,703 | Scoville | Sept. 20, 1904 |
| 777,942 | Denman | Dec. 20, 1904 |
| 879,837 | Pearson | Feb. 18, 1908 |
| 977,105 | Lippold | Nov. 29, 1910 |
| 1,010,924 | Lamb | Dec. 5, 1911 |
| 1,152,485 | Carroll | Sept. 7, 1915 |
| 1,477,743 | Wulff | Dec. 18, 1923 |
| 2,321,995 | Cockburn | June 15, 1943 |
| 2,367,718 | Farrell | Jan. 23, 1945 |

OTHER REFERENCES

Webster's New International Dictionary; 2 ed.; 1941; Merriam Co.; N. Y., N. Y.; page 458.